Feb. 5, 1935.     O. IMBER ET AL     1,989,805
BANK BALANCING AND CHECK WRITING DEVICE
Filed Aug. 24, 1927     4 Sheets-Sheet 1
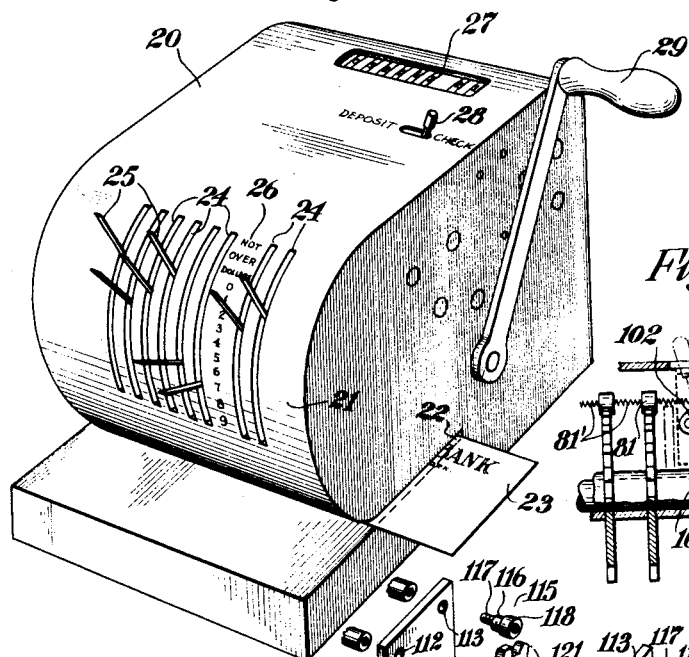
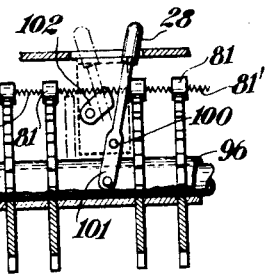
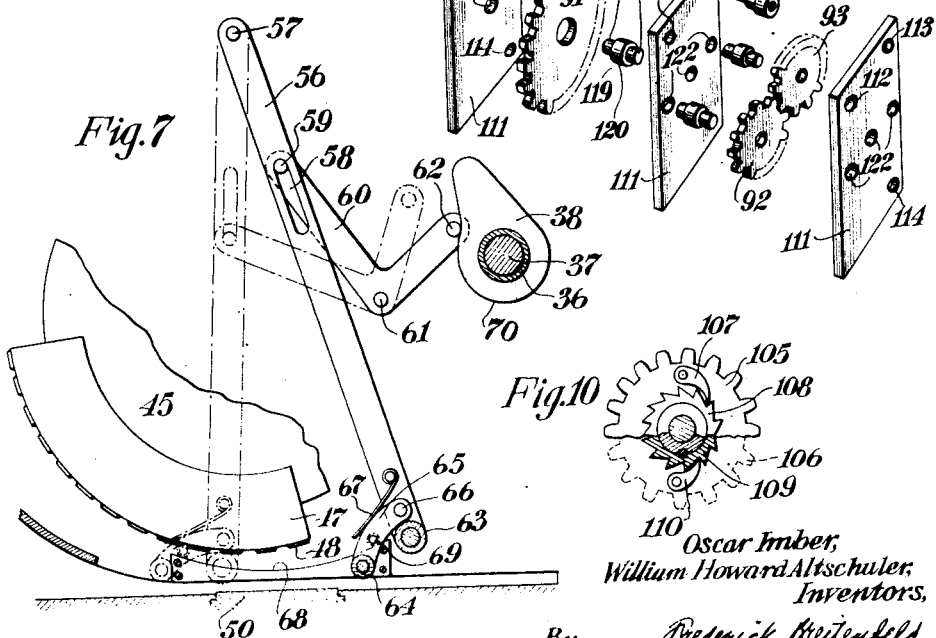
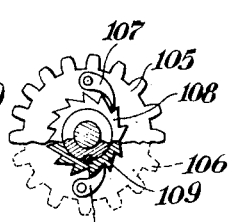

Feb. 5, 1935.  O. IMBER ET AL  1,989,805
BANK BALANCING AND CHECK WRITING DEVICE
Filed Aug. 24, 1927  4 Sheets-Sheet 2
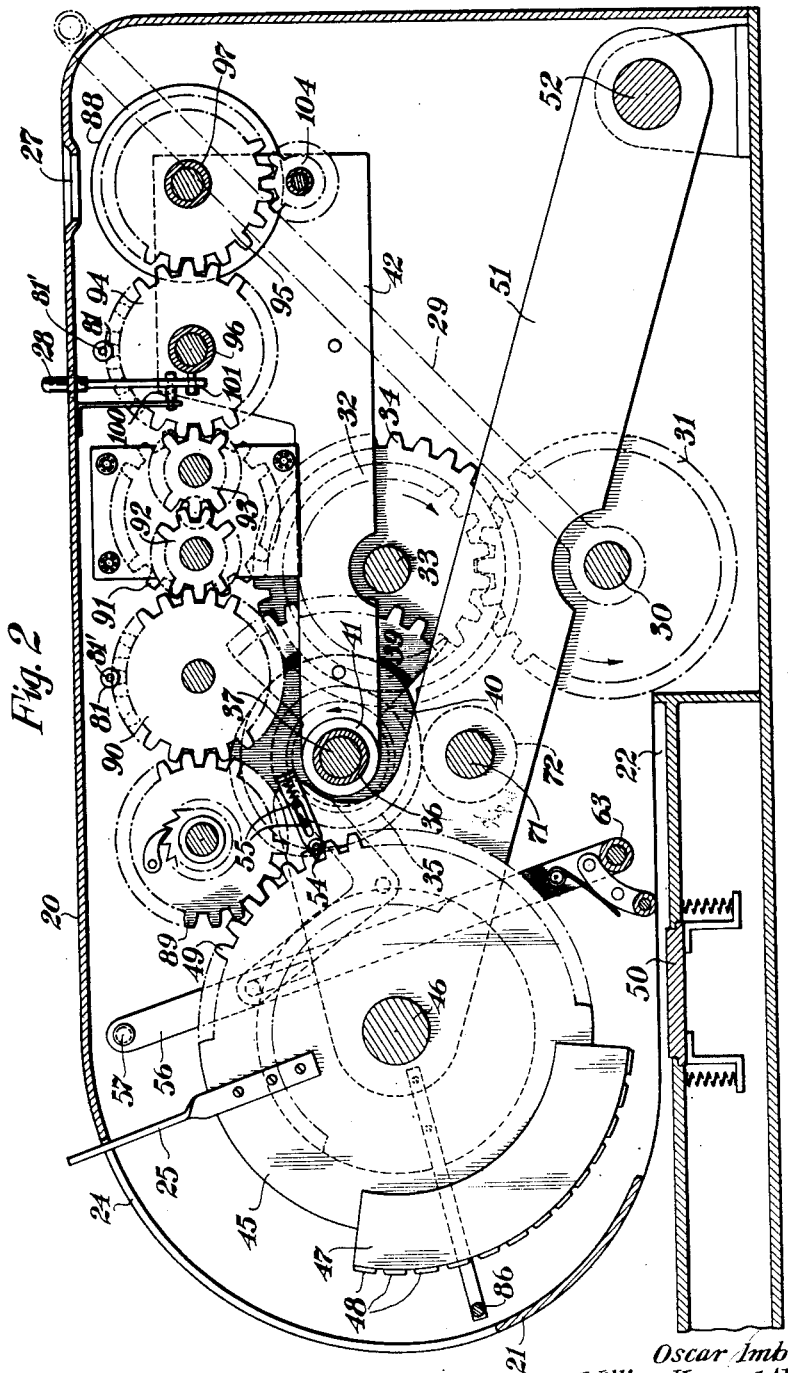
Oscar Imber,
William Howard Altschuler,
Inventors,
By Frederick Breitenfeld
ATTORNEY

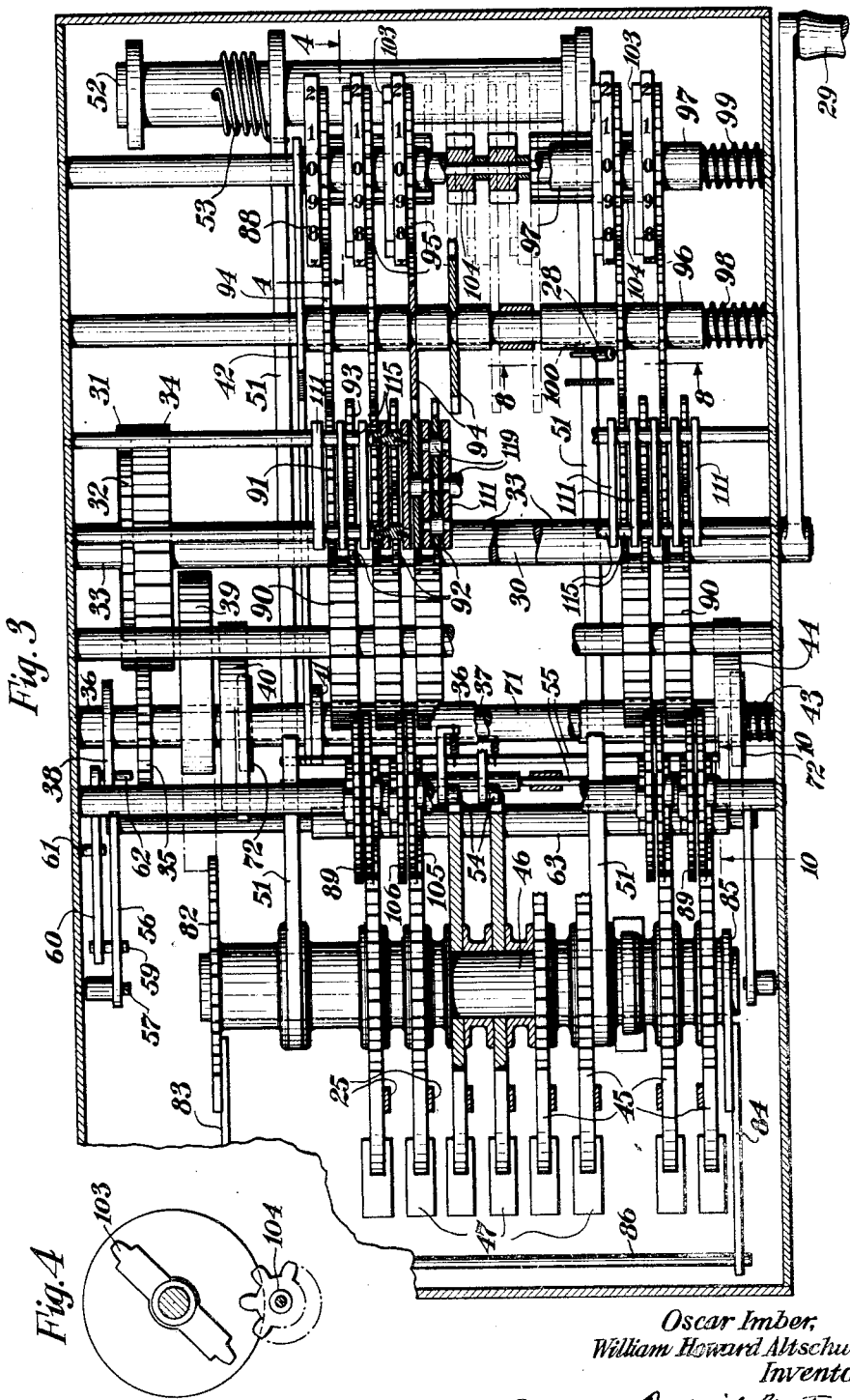

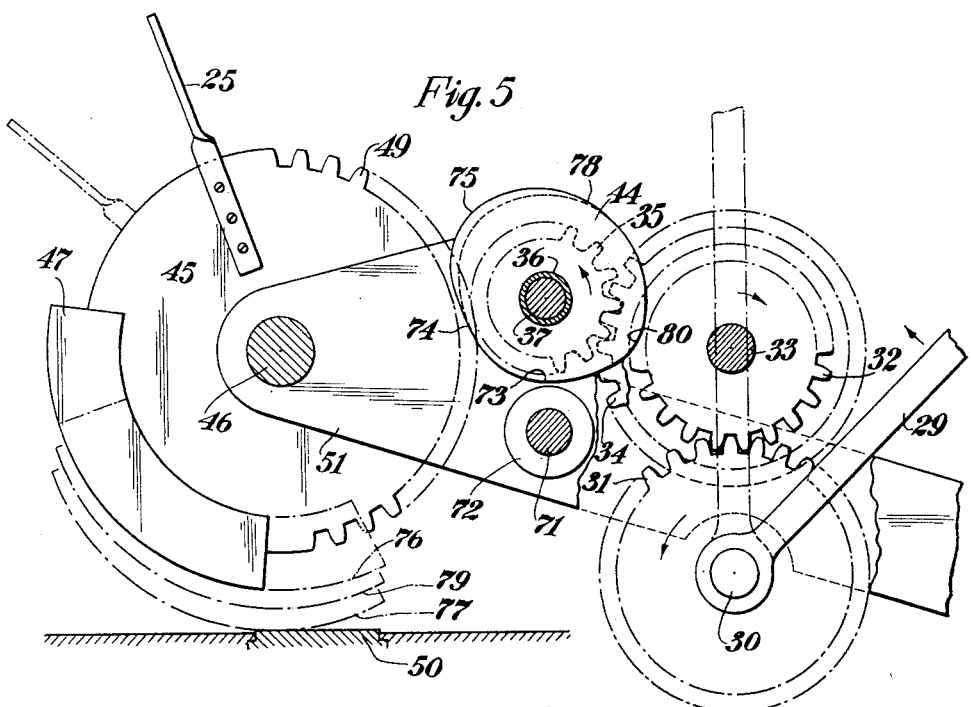

Patented Feb. 5, 1935

1,989,805

UNITED STATES PATENT OFFICE 1,989,805

BANK BALANCING AND CHECK WRITING DEVICE

Oscar Imber, New York, and William Howard Altschuler, Brooklyn, N. Y.

Application August 24, 1927, Serial No. 214,998

7 Claims. (Cl. 235—58)

Our present invention relates generally to check writing devices, and has particular reference to a device which embodies recording or indicating features rendering its use particularly valuable.

It is a primary object of our invention to provide a check writing apparatus which is provided with means for continuously indicating the balance in the account to which the checks relate. More particularly, it is an object to provide a device whereby a blank inserted check may be suitably burred, printed with the desired amount, and whereby the employment of the device in this manner will automatically cause a continuously indicated balance to be automatically reduced as the checks are drawn.

It is another object of our invention to provide such a device with means for increasing the indicated balance when a deposit is made into the account. It is a particular object to provide suitable reversing means whereby this alteration of the balance in an additive manner may be effected by substantially the same simple manipulations which are employed when the device is normally used for printing checks.

Briefly, our invention comprises a device which provides, in combination, a printing bed or platen, adjustable printing type, means for setting the type into desired operative relationship, balance-indicating means, and mechanism automatically operable by the check writing apparatus for normally reducing the balance indicated by the amount of the check to be printed. More particularly, this mechanism is operatively interposed between the type setting means and the balance-indicating device and operates automatically to alter the balance indicated when the adjustable type is set for the desired amount.

The reversing means which we provide is of an extremely simple character, necessitating merely the adjustment of a simple control handle from one position to another. This adjustment renders the mechanism so operative that when the adjustable type is set as though a check were to be drawn, the balance indicated is automatically altered in an additive manner instead of a subtractive manner.

It is another object of the invention to provide a device wherein a single manually operable handle achieves by one operation (a) an inking of the type, (b) a burring of the check, (c) a printing of the desired type upon the check, and (d) a clearing of the adjusted or set type. It is a feature of our invention to provide means whereby the clearing is always effected independently of the balance indicated. It is another feature to provide means for preventing inking, burring, and printing procedures when the alteration to the balance is desired to be additive.

In the embodiment which we have illustrated in the drawings and shall hereinafter describe, a common drive shaft is operable by the control handle, and this shaft controls by its rotation (a) the inking and burring, (b) the printing, where such is desired, and (c) the automatic clearing. More particularly, the printing is effected by moving the set type toward the platen, and the drive shaft carries a suitable cam for effecting this procedure. It is a particular feature of our invention to provide this cam with two surfaces, one of which is normally operative and which effects a printing, and the other of which is normally inoperative and prevents a printing when it is rendered operative. It is a particular feature of our invention to arrange the reversing means heretofore referred to in such a manner that its adjustment will automatically substitute the normally inoperative or non-printing cam surface for the normally operative or printing cam surface.

Other features of our invention reside in the particular arrangement and construction of parts hereinafter more fully set forth whereby we are enabled to provide an apparatus which is at one time relatively simple and hence inexpensive to manufacture, yet highly efficient and practically valuable in operation.

For the attainment of the foregoing objects and such other objects as may hereinafter appear or be pointed out, we have illustrated one embodiment of our invention in the accompanying drawings in which—

Fig. 1 is a perspective view of our complete device, showing the general arrangement of parts and the general structural nature of the device;

Fig. 2 is a cross-sectional view taken from the right side of Figure 1 and showing the general relative arrangements of the various portions of the apparatus;

Fig. 3 is a cross-sectional plan view showing the general arrangement of the interior parts;

Fig. 4 is a fragmentary view taken substantially along the line 4—4 of Figure 3 and showing a detail of the construction;

Fig. 5 is a view similar to Figure 2 showing certain operative elements of the device by themselves and illustrating particularly the method whereby the printing procedure is controlled;

Fig. 6 is a view similar to Figure 5 showing certain other elements by themselves and indicating particularly the mechanism for effecting the automatic clearing;

Fig. 7 is a view taken in the same direction as Figures 5 and 6 and showing certain other elements by themselves, indicating particularly the method whereby the inking and burring procedures are effected;

Fig. 8 is a detail view taken substantially along the line 8—8 of Figure 3 and indicating particularly the adjustable control device for the reversing means;

Fig. 9 is an exploded view of certain gear elements and their associated parts, and illustrating certain features of our invention; and Fig. 10 is a detail view, partly broken away, taken substantially along the line 10—10 of Figure 3.

Referring first to Figure 1, it will be noted that the device comprises a casing 20 having a substantially semi-circular forward face 21 continuing around to form the upper surface of a slot 22 within which the blank check 23 to be printed is insertable. The lower surface of the slot 22 constitutes a printing bed. The curved surface 21 is provided with a series of vertically arranged slots 24 from which manually controllable handles 25 extend. These handles are internally connected with a corresponding number of axially aligned drums upon which the printing type is carried. A suitable scale 26 is marked upon the surface 21, and it will be understood that the handles 25 may be individually adjusted in accordance with this scale, thereby bringing the corresponding printing type into proper position over the printing bed beneath.

It need hardly be pointed out that the first two slots 24 at the right represent units and tens, or cents, whereas the other slots in succession represent units of dollars, tens of dollars, etc. The type arranged on each of the printing drums comprises a series of circumferentially arranged numerals, and this type also includes on each drum the words "Not", "Over", and suitable other markings which make it possible to print upon a check any desired indication, such as "Notover three hundred twenty-five dollars and sixty-seven cents".

Toward the rear of the top of the casing 20 is an opening 27 through which a series of numerals are continuously visible. The opening 27 is preferably provided with a hingable cover (not shown) which will prevent unauthorized accidental observation of the numerals. These numerals are arranged upon a corresponding number of drums arranged in the rearward portion of the casing, and the displayed numerals serve to represent a balance. The drums carrying the balance-indicating numerals are operatively connected with the type setting means (which includes the printing drums), and the mechanism is so devised that when a desired amount is set by manipulating the handles 25, the balance indicated through the opening 27 will be automatically reduced by a corresponding amount.

Immediately in front of the opening 27, or at any other suitable position, we provide a control lever 28 for the reversing means. This control lever is normally in a position indicated in the drawing by the letters "Check". When it is desired to increase the balance indicated, the lever 28 is thrown to the position shown in Figure 1, and when this is done, the balance indicated will be automatically increased by any amount to which the type is set.

A manually controllable operating handle 29 is provided upon the right-hand side of the casing 20. By swinging this handle forwardly from the position shown in Figure 1 to a substantially horizontal position, i. e., through approximately 120°, the apparatus is made to successively (a) ink the set type and burr the blank check beneath, (b) print the check with the desired amount, and (c) clear the type, i. e., return all the handles 25 to their normal positions at the uppermost ends of the slots 24. The handle is so arranged that it may then swing back to its normal position and be in readiness for the subsequent printing operation.

Having thus described the general nature of our device and the manner in which it is designed to be employed, we will now proceed to describe in greater detail the internal mechanism which permits us to accomplish these desirable results.

Referring for the moment to Figures 2 and 3, the handle 29 is mounted upon a spindle 30 which extends transversely across the casing adjacent to the bottom thereof. Mounted on the spindle 30 is a gear 31 which meshes with a somewhat smaller gear 32, the latter being mounted upon a spindle 33 arranged above the spindle 30. adjacent to the gear 32 is a somewhat larger gear 34 similarly mounted upon the spindle 33 and meshing with a smaller gear 35 mounted upon the main drive shaft 36. The shaft 36 is axially shiftable and may therefore be constituted of a sleeve mounted upon a rod 37. The purpose of the shiftability of this drive shaft will be described hereinafter; for the time being it will be noted that the drive shaft is rotated by virtue of the gear 35. The gearing is so arranged that a 120° swing of the handle 29 will effect a 360° revolution of the drive shaft 36, and a suitable ratchet arrangement (not shown) is also provided to permit the handle 29 to return to its normal position without causing a return rotation of the drive shaft 36.

Referring to Figure 3, we will briefly describe the elements mounted upon the shaft 36. These elements are first a cam 38 for controlling the inking and burring device; then a gear segment 39 for controlling the clearing; then a double-surfaced cam 40 for controlling the actual printing procedure. The shaft 36 also carries a collar 41 against which a plate 42 may bear when the shaft is desired to be shifted against the spring 43. A second-double-surfaced cam 44, identical with the cam 40, is preferably provided at a spaced distance from the other cam so that the action initiated by these cams will be evenly and efficiently carried out.

Before proceeding to describe the individual actions of the elements carried upon the shaft 36, we will point out that a bank of axially aligned printing drums 45 are arranged forwardly of the shaft 36. These drums are mounted upon a spindle 46, more clearly shown in Figure 2, and each drum is provided with a segment 47 carrying the printing types 48 thereon and a tooth portion 49 substantially opposite the segment 47. Each drum has also mounted thereon one of the handles 25, the extreme end of the latter extending outwardly through one of the slots 24.

Almost directly beneath the bank of drums 45 is a printing bed or platen 50 upon which the check to be printed is designed to be placed. Reference to Figure 2 will indicate clearly how a line of set type may be arranged in printing position over the platen 50 by simply adjusting the handles 25 from the exterior of the device.

The spindle 46 is mounted upon two arms 51 extending downwardly and rearwardly to a spindle 52 fixedly mounted in the rear lower portion of the casing. A spring 53 serves to keep the arms 51 in their normal position indicated in Figure 2, but the action of the spring 53 is overcome during certain operations of the device to lower the entire bank of drums 45 toward the printing bed 50.

A set of detents 54, mounted upon two rods 55 which extend transversely across the device and are carried by the arms 51, are adapted to engage the teeth 49 of the drums 45 and thereby assure proper setting of the drums. In other words, when any handle 25 is adjusted, the drum to which it is attached moves in a step by step manner as each successive tooth forces its way past the detent 54 and the latter then positions itself firmly in the space between the teeth. This step by step movement assures the proper alignment of the types brought into position above the platen 50.

Referring now more particularly to Figure 7, we will describe the action of the cam 38. An inking and burring arm 56 is pivoted at its upper end 57 so as to swing substantially between the full line position of Figure 7 and the dotted line position thereof. A slot 58 is adapted to receive a pin 59 carried by one end of a bell crank 60. The latter is mounted upon a spindle 61 and carries a pin 62 at the end of its other arm for engagement by the cam 38. When the cam 38 rotates in a counterclockwise manner (as viewed in Figure 7), the bell crank 60 is compelled to pivot into the dotted line position, thereby swinging the arm 56 into the dotted line position. Upon the continued rotation of the cam 38, the arm 56 returns to its normal position under the action of a spring (not shown).

The lowermost end of the arm 56 is provided with an inking roller 63 so positioned that it will pass over the type 48 which has been set for printing. The lower end of the arm 56 is also constructed to provide a burring device for rolling over the check to be printed and roughening its surface in a wellknown manner. The burring device comprises a burr 64 carried upon the end of a pair of links 65 pivoted to the arm 56 at 66. The links 65 are urged downwardly by springs 67, and the path of movement of the burr 64 is determined by two guides 68 mounted upon opposite sides of the casing and adapted to receive the rollers 69 thereon; the rollers 69 projecting sidewardly from the links 65. The burring device is not shown in Figure 3.

The cam 38 is so mounted upon the drive shaft that the arm 56 will be pivoted to and fro as an initial operation. From the description given, it will be understood that the pivoting of this arm will effect a simultaneous inking of the type and burring of the check beneath. For the balance of the shaft rotation, the cam 38 is totally inoperative as will be evident from the concentric surface 70 thereof.

Referring now more particularly to Figure 5, we will describe the action of the cam 44, it being understood that the cam 40 is identical therewith.

A rod 71 extends transversely between the arms 51 and projects slightly beyond each arm. At the proper point along each extension is a follower 72 designed to be acted upon by the peripheral surface of the cam 40 or 44 as the case may be. In Figure 5, the peripheral surface which is normally operative is shown in full lines, and the surface which is normally inoperative is shown in dotted lines. The position shown in Figure 5 is the normal and initial position of the cam 44. As it rotates counterclockwise, a concentric portion extending from the point 73 to the point 74 passes over the follower 72 and does not move the latter. The angular distance between 73 and 74 is equal to the angular distance through which the cam 38 is operative. From the point 74 to a point 75, the cam 44 serves to press the follower 72 downwardly, and this downward movement is sufficient to move the type from the normal position 76 to the lowermost position 77. As the cam 44 continues to rotate, from the point 75 to the point 78, the type is slightly withdrawn from the printing bed to an intermediate or partially withdrawn position indicated by the dotted line 79. This position of the type is retained until a point 80 is reached, from which point onward to the point 73 the type is raised to the normal position 76. During the retention of the type in the position 79, i. e., during the period that the surface 78 to 80 is in engagement with the follower 72, the clearing mechanism operates, and this mechanism will be presently described.

When the normally inoperative surface of the cam 44 is operative upon the follower 72, the type is lowered from the normal position 76 to the partial position 79 and no further. This is due to the fact that the second cam surface referred to is concentric from the point 74 to the point 80 and is devoid of the unconcentric portion embodying the point 75.

It will be understood that the followers 72 are of such a width that when the drive shaft 36 is shifted, the normally operative surfaces of the cams 40 and 44 will slide off the followers 72 and the normally inoperative surfaces will slide on, and vice versa. The followers 72 are indicated in Figure 3 beneath the normally operative surface portions of the cams.

Referring now more particularly to Figure 6, it will be noted that the clearing mechanism comprises a gear 82 loosely mounted upon the spindle 46 and positioned so as to be encountered by the segment 39 after a predetermined rotation of the shaft 36. Carried by the gear 82 is an arm 83 (Figure 3), and a corresponding arm 84 is loosely mounted as at 85 upon the opposite end of the spindle 46. Between the arms 83 and 84 a rod 86 extends, the rod 86 being so positioned as to encounter the handles 25 when it travels through the arcuate path indicated by the arrows 87.

It will be understood that the segment 39 becomes operative during that period of operation of the cam 44 at which the surface between 78 and 80 engages the follower 72. In other words, the segment 39 becomes operative upon the gear 82 during the period in which the printing type is in the partially withdrawn position 79 of Figure 5. When the segment 39 is operative, it rotates the gear 82, thereby causing the bar 86 to swing upwardly along the line indicated by the arrows 87; and inasmuch as all the drums 45 are independently movable about the spindle 46, this upward movement of the arm 86 will cause all of the handles 25 and the corresponding drums 45 to swing upwardly to their normal positions. After the segment 39 has left contact with the gear 82, the weight of the bar 86 and associated parts will cause the bar to resume the normal position shown in Figure 6. A spring may be employed where desired to assure this return.

Before proceeding to describe the balance-indicating means, we will briefly review the procedures effected by the 120° movement of the arm 29. This movement of the arm causes the drive shaft 36 to make a complete revolution. The initial part of this revolution is accompanied by a swinging movement of the arm 56, thereby inking the set type and burring the check beneath. Immediately after this procedure, the cams 40 and 44 become operative. When the normally operative surfaces engage the followers 72, the set type moves downwardly into engagement with the printing bed and immediately thereafter withdraws itself partially to the position 79 of Figure 5. (When the normally inoperative surfaces of the cams 40 and 44 engage the followers 72, the set type moves downwardly to only the position 79.) Toward the end of the period during which the type is in this partial position 79, the segment 39 becomes operative and clears the type, returning all the type drums to their normal positions. Immediately thereafter, the bar 86 drops to normal position, and the arms 51 are permitted to return upwardly to their normal positions.

We will now describe how the initial adjustment of the handles 25 will automatically alter the balance indicated, this alteration being normally a subtractive one.

Each drum 45 has a train of gears leading therefrom to one of the drums 88 upon which the indicating numerals are mounted. The first gear with which the teeth of a drum 45 engages is of a duplex construction later to be described. For the time being, it will suffice to designate this gear generally by the reference numeral 89 (Figures 2 and 3). The gear 89 will rotate in a clockwise direction in Figure 2. It will in turn rotate a relatively wide gear 90 in a counterclockwise direction. The gear 90 is in simultaneous mesh with a single gear 91 and the first of a gear pair 92. The other member 93 of the gear pair is in constant mesh with the first member 92 but meshes with no further gear under normal circumstances. The normal gear train therefore extends through the gear 91, which is rotated in a clockwise direction in Figure 2. The gear 91 meshes with a gear 94, and the latter engages and drives a gear 95 carried by a drum 88.

Each of the gears 89, 90, 91, 94 and 95 is mounted upon a transverse axis adjacent to the upper portion of the casing. These axes are arranged substantially behind each other along a horizontal line as indicated in Figure 2. For keeping the teeth of the gears 90 and 94 always in alignment, we preferably provide a series of detents 81 mounted upon a pair of transverse springs 81' extending across the casing. Each detent yieldably engages between two adjacent teeth of each gear.

The drums 88 have two sets of figures upon each thereof, but the gear is so arranged that when a particular handle 25 is moved to print a certain amount, the corresponding drum 88 will move so as to reduce the indicated balance by the same amount. When it is desired to cause an additive alteration of the balance, the normally inoperative gear pair 92 and 93 is rendered operative, thereby reversing the rotation of the drum 88. This gear pair is rendered operative in place of the single gear 91 by shifting both the gear 94, the gear 95, and the drum 88 itself axially so as to cause the gear 94 to mesh with the second member 93 of the gear pair. This shifting is rendered possible by mounting the gears 94 upon a sleeve 96 and by mounting the gears 95 and the drums 88 upon a second sleeve 97. Each of these sleeves is normally retained in proper subtractive position by springs 98 and 99 respectively. The sleeves are shifted by means of a control lever 28 which is pivotally mounted about a fixed pivot 100 (Fig. 8) and which has its lowermost portion 101 suitably forked and positively engaged with the sleeve 96. A suitable spring clamp 102 is preferably provided to engage the lever 28 when it is shifted. The sleeves 96 and 97 are integrally associated with the plate 42 which engages the collar 41 on the shaft 36. In this way, an adjusting movement of the lever 28 will shift not only all the gears 94 and 95 but also the drums 88 and the drive shaft 36. The reason for shifting the drive shaft 36 is to render the normally inoperative surfaces of the cams 40 and 44 operative and the normally operative surfaces inoperative, also to render the cam 38 inoperative. Obviously, the entire sleeve shaft 36 need not be rendered shiftable; only the cams 40, 44, and 38 or their equivalents must so constructed and arranged as to be axially adjustable.

After this shift has been effected, the gear train leads from the gear 90 through the gears 92 and 93 and thence to the drum 88, the latter being thereby rotated in the opposite direction and causing an additive alteration of the balance.

Although each of the drums 88 is independently mounted, it will be understood that these drums must in some way be associated with each other so that when a shift from "0" to "9" is produced upon one drum, the drum adjacent and representing the relative tens column will also move so as to reduce its displayed numeral by one. This association of the drums 88 is more fully illustrated in Figure 4 wherein it will be observed that each drum carries a two-toothed gear 103, the two teeth being diametrically opposite to each other and being necessary because of the two sets of numerals upon each drum. The gear 103 engages at the proper time with a spur gear 104 meshing with the next succeeding gear 95.

It will thus be understood that although each drum 88 must be positively movable by an adjustment of the corresponding initial drum 45, nevertheless each drum 88 must be free to move further without transmitting this movement backwardly to the drum 45. To achieve this result, each gear 89 is of a double construction illustrated more fully in Figure 10. Two gears 105 and 106 are mounted side by side and are independently movable except as hereinafter described. Mounted upon the gear 105 is a pawl 107 adapted to engage a ratchet 108 concentrically mounted therewith. The ratchet 108 is keyed to a ratchet 109 whose teeth are arranged in the opposite direction. The ratchet 109 actuates the pawl 110 which is in turn carried by the second gear 106. Accordingly, when the gear 105 is caused to rotate by an adjustment of a handle 25, it transmits this rotation through the pawl 107, ratchet 108, ratchet 109, and pawl 110 to the gear 106 and thence to the gear 90. It will be noted in Figure 3 that the gear 105 is in constant mesh with the teeth of a drum and not with the gear 90, whereas the gear 106 is in constant mesh with the gear 90, but not with the teeth of the drum.

This ratchet and pawl arrangement makes it possible for the drum 88 to continue its rotation, when it is actuated through the spur 104 by the adjacent drum, with re-transmitting this additional movement back to the drum 45, for upon reference to Figure 10, it will be noted that a continued rotation of the gear 106 will simply cause the pawl 110 to ride over the teeth of the ratchet 109.

This ratchet and pawl arrangement makes it also possible to clear the drums 45 without affecting the balance indicated, for in such an event, the gear 105 is rotated in the opposite direction and this will simply cause the pawl 107 to ride over the teeth of the ratchet 108.

The drum clearance referred to in the preceding paragraph is one which takes place, for example, when it is desired to effect a subtraction or addition, with respect to the indicated balance, without thereafter manipulating the handle 29. Under ordinary check printing operation of the device, as pointed out hereinbefore, the clearing is accomplished independently of the gears 105, i. e., while the drums 45 are totally out of engagement with the gears 105, because it then takes place while the drums are in a partially advanced position indicated by the line 79 of Figure 5.

An important feature of our invention lies in the construction of the gear set 91, 92, and 93. A set of spaced supporting plates 111 (Figure 9) are provided with bores 112, 113, and 114 respectively, these bores being adapted to receive spacing studs 115. Each of the latter comprises a medial shank portion 116 adapted to fit snugly within the bore in the plate 111, a reduced portion 117 externally threaded, and an enlarged portion 118 internally threaded. The enlarged portion 118 constitutes a spacing washer and is adapted to receive in its threaded bore the reduced portion 117 of the adjacent stud 115.

In alternate spaces between the plates 111 we mount the single gears 91, and in the remaining spaces we mount the gear pairs 92—93. The gears are each supported upon journals 119 comprising enlarged medial portions 120 adapted to fit snugly in the central bore of each gear, and reduced journal portions 121 adapted to fit into suitable bearing bores 122 provided in the plates 111.

This construction of the reversing gear assembly enables us to provide one such set of reversing gears for each drum without encumbering the entire device. The assembled structure is simple, inexpensive from a manufacturing standpoint, compact, and highly efficient in fulfilling its function.

When the device is employed in its normal manner for drawing and writing checks, the handles 25 are set to the amount of check desired, the check 23 is inserted into the groove 22, and the handle 29 is drawn forwardly and then released. During the adjustment of the handles 25, the indicated balance will have been reduced by the amount to which the type was set.

When it is desired to increase the balance after a deposit has been made, it is only necessary to shift the lever 28 and thereupon adjust the handles 25 to the amount of the deposit. The handles may then be cleared by hand or the lever 29 may be manipulated in its usual manner. In the latter case, no printing will be effected, but the clearing device will serve to clear the type.

It will be obvious that many changes in the details herein described and illustrated for the purpose of explaining the nature of our invention may be made by those skilled in the art without departing from the spirit and scope of the invention as expressed in the appended claims. It is therefore intended that these details be interpreted as illustrative and not in a limiting sense.

Having thus described my invention and illustrated its use, what we claim as new and desire to secure by Letters Patent is—

1. In a check printing device, the combination with a printing bed, adjustable printing type, means for setting desired type preparatory to printing, and means for bringing the set type and the printing bed together in order to print; of balance-indicating means, mechanism operable by the type setting means for automatically altering the balance indicated by the amount to which the type is set, and means for selectively causing said alteration to be either additive or substractive, said last named means being arranged to render the printing means inoperative when the alteration is additive.

2. In a check writing device, a printing bed, adjustable printing type, means for setting desired type into operative position, and means for bringing the set type toward the printing bed; said last named means including an adjustable double-surfaced cam, one of the surfaces being arranged and constructed to bring the type fully toward the bed in order to print, and the other surface being arranged and constructed to bring the type only partially toward the bed; and means for adjusting the cam to selectively render either one or the other of said surfaces operative.

3. In a check writing device, a printing bed, adjustable printing type, means for setting desired type into operative position, and means for bringing the set type toward the printing bed; said last named means including an adjustable double-surfaced cam, one of the surfaces being arranged and constructed to bring the type fully toward the bed in order to print, and the other surface being arranged and constructed to bring the type only partially toward the bed; the first surface being normally operative and the second surface being inoperative; balance-indicating means, mechanism automatically operable by the type setting means for normally reducing the balance indicated by the amount of the check being printed, and reversing means for rendering said mechanism operative when desired to automatically increase the balance instead of reducing it, said reversing means being arranged to simultaneously adjust the cam to render said second surface operative and the first surface inoperative.

4. In a check writing device, the combination with a printing bed adapted to receive a check, of a set of drums arranged in parallel vertical planes above said bed and carrying printing type, means for individually rotating said drums to set desired type in operative position over said bed preparatory to printing, balance-indicating means comprising a corresponding second set of drums and carrying suitable indicia, means operable by rotation of the first-named drums for automatically rotating the corresponding drums of said second set to reduce the balance indicated by said indicia by the amount of the check to be written, and means for causing the set type to print and for thereupon rotating only the first-mentioned set of drums back to their initial positions so as to clear said type without disturbing the setting of said second set of drums.

5. In a check writing device, the combination with a printing bed adapted to receive a check, of a set of drums arranged in parallel vertical planes above said bed and carrying printing type, means for individually rotating said drums to set desired type in operative position over said bed preparatory to printing, balance-indicating means comprising a corresponding second set of drums and carrying suitable indicia, means operable by rotation of the first-named drums for automatically rotating the corresponding drums of said second set to reduce the balance indicated by said indicia by the amount of the check to be written; said means comprising a gear train operatively interposed between each drum of said first-named set and the corresponding drum of said second set, said gear train being arranged substantially in the plane of the two drums which it connects, and means for causing the set type to print and for thereupon rotating only the first-mentioned set of drums back to their initial positions so as to clear said type without disturbing the setting of said second set of drums.

6. In a check writing and balance-indicating device, the combination with a printing bed adapted to receive a check, printing type, and means for setting desired type in operative position preparatory to printing; of balance-indicating means, mechanism normally operable by the type-setting means for reducing the indicated balance by the amount to which the type is set, a control handle, means normally operable by said handle for causing the set type to print and for thereupon clearing said type, reversing means for adjusting said mechanism so that the latter will increase instead of reduce said balance, and means operable by said reversing means for rendering the printing means inoperative.

7. In a check writing device, a printing bed adapted to receive the check, a set of drums arranged in parallel vertical planes above said bed, printing type carried by said drums on the peripheries thereof, means for rotating said drums individually to set desired type in operative position above said bed preparatory to printing, a balance-indicating means comprising a corresponding second set of drums, mechanism normally operable by rotation of said first-named drums for rotating the second set of drums to reduce the indicated balance, a control handle, means normally operable by said handle for causing the set type to print, reversing means for rendering said mechanism operative to rotate said second-named drums in the opposite directions to increase the indicated balance, and means operable by said reversing means for rendering the printing means inoperative.

OSCAR IMBER.
WILLIAM HOWARD ALTSCHULER.